(12) United States Patent
Mollett et al.

(10) Patent No.: US 7,775,425 B1
(45) Date of Patent: Aug. 17, 2010

(54) SYSTEM AND METHOD FOR APPROVING A LIMIT OF CHECK CASHING OVER TIME

(75) Inventors: Cassandra J. Mollett, Houston, TX (US); Mollie M. Hellige, Houston, TX (US); Daniel R. Ahles, Houston, TX (US)

(73) Assignee: First Data Corporation, Greenwood Village, CO (US)

( * ) Notice: Subject to any disclaimer, the term of this patent is extended or adjusted under 35 U.S.C. 154(b) by 0 days.

(21) Appl. No.: 09/474,671

(22) Filed: Dec. 29, 1999

(51) Int. Cl.
    *G06Q 40/00* (2006.01)
(52) U.S. Cl. .................................. 235/379; 705/33
(58) Field of Classification Search ............... 705/35, 705/37, 38, 39, 42, 44, 45, 16, 22, 26, 33; 235/379, 375, 382, 382.5
    See application file for complete search history.

(56) References Cited

U.S. PATENT DOCUMENTS

| | | | | |
|---|---|---|---|---|
| 4,109,238 A | * | 8/1978 | Creekmore | 340/5.8 |
| 4,187,498 A | * | 2/1980 | Creekmore | 340/5.8 |
| 5,175,682 A | * | 12/1992 | Higashiyama et al. | 705/45 |
| 5,262,941 A | * | 11/1993 | Saladin et al. | 705/38 |
| 5,383,113 A | * | 1/1995 | Kight et al. | 705/40 |
| 5,649,116 A | * | 7/1997 | McCoy et al. | 395/238 |
| 5,679,940 A | * | 10/1997 | Templeton et al. | 235/380 |
| 5,877,485 A | * | 3/1999 | Swartz | 235/383 |
| 6,014,645 A | * | 1/2000 | Cunningham | 705/38 |
| 6,029,149 A | * | 2/2000 | Dykstra et al. | 705/38 |
| 6,029,154 A | * | 2/2000 | Pettitt | 705/44 |
| 6,038,553 A | * | 3/2000 | Hyde, Jr. | 705/45 |
| 6,045,039 A | * | 4/2000 | Stinson et al. | 235/379 |
| 6,064,987 A | * | 5/2000 | Walker et al. | 705/38 |
| 6,078,902 A | * | 6/2000 | Schenkler | 705/35 |
| 6,105,011 A | * | 8/2000 | Morrison, Jr. | 705/45 |
| 6,119,103 A | * | 9/2000 | Basch et al. | 705/35 |

(Continued)

OTHER PUBLICATIONS

Jalinna Jones, "TeleCheck introduces in-store check processor", Business Wire; New York, Jun. 27, 1996, two pages.*

(Continued)

*Primary Examiner*—Andrew Joseph Rudy
(74) *Attorney, Agent, or Firm*—Sutherland Asbill & Brennan LLP

(57) ABSTRACT

The invention involves a system and a method of approving a money limit of check cashing for a time period during which a check writer may cash checks up to the limit. The invention provides for an improvement of approving a money limit of check cashing in order to provide in advance a check cashing limit for at least one period of time. The invention includes storing historical check writing information of check writers, receiving identification information to access respective check writing information, processing the respective check writing information to determine a score for the check writer, classifying the check writer in a predetermined category, and determining the limit over the time period during which the check writer may cash checks up to the limit based on the category in which the check writer is classified. The invention further includes declining the check writer from cashing checks for the time period of the check writer is classified in one category, and approving the check writer to cash checks for the limit over the time period if the check writer is classified in another category.

6 Claims, 3 Drawing Sheets

U.S. PATENT DOCUMENTS

| | | | |
|---|---|---|---|
| 6,145,738 A * | 11/2000 | Stinson et al. | 235/379 |
| 6,164,528 A * | 12/2000 | Hills et al. | 235/379 |
| 6,175,824 B1 * | 1/2001 | Breitzman et al. | 705/36 |
| 6,269,348 B1 * | 7/2001 | Pare, Jr. et al. | 705/39 |
| 6,282,523 B1 * | 8/2001 | Tedesco et al. | 705/45 |
| 6,289,319 B1 * | 9/2001 | Lockwood | 705/35 |
| 6,317,745 B1 * | 11/2001 | Thomas et al. | 707/100 |
| 6,405,181 B2 * | 6/2002 | Lent et al. | 705/38 |
| 6,424,949 B1 * | 7/2002 | Deaton et al. | 705/14 |
| 6,464,134 B1 * | 10/2002 | Page | 235/379 |
| 2002/0073019 A1 * | 6/2002 | Deaton | 705/38 |

OTHER PUBLICATIONS

Anonymous, "Custom-designing a new solution", Chain Store Age Executive with Shopping Center Age; New York, Sep. 1994, three pages.*

* cited by examiner

SYSTEM AND METHOD FOR APPROVING A LIMIT OF CHECK CASHING OVER TIME

TECHNICAL FIELD

The present invention relates to a system and method of approving a limit of check cashing for a time period during which a check writer may cash checks up to the limit.

BACKGROUND ART

The use of check writing, cashing, or honoring has grown ever so common. The continuous increase in the transmission of information has lowered the need to constantly carry cash and has, in effect, heightened the use of writing and cashing checks when cash is needed. Also, check cashing provides an easy way for a check writer to obtain cash without visiting a bank or an electronic teller.

Likewise, check and check writer analysis for check approval or denial have increased in number and in types used. Typically, at a point of transaction in which a check is written, a merchant or an entity paid by the merchant performs a check and check writer analysis in order to determine whether to accept or honor the check. Depending on parameters and calculations which are to be used, there are several ways of performing such analysis.

For example, a number of parameters specific to the transaction are processed and incorporated within an analysis program. The parameters used may include, e.g., time of day, date, check number, check amount, credit rating of the check writer, etc. Each available parameter specific to the transaction is given a score reflecting the risk level of the check and check writer based on pre-stored historical information of the check writer. Each parameter may be, and typically is, weighted in accordance with its relative importance within the analysis. In this example, the scores for each parameter are added to provide a sum of the scores. The sum is then classified within a predetermined scale of scores. Depending on the reference used, the sum may or may not fall within an approval range. If it does, then the check is approved, and if not, then the check is denied. The check writer is notified of the result.

Additionally, analysis may vary depending on, for example, the type of transaction or the point of transaction. That is, the analysis may be configured to have a lower standard in one type of transaction and a higher standard in another type of transaction, based on historical or researched information.

Current systems implemented to perform check and check writer approval are adequate; however, current systems may be improved. One current system generally includes an analysis which simply approves or denies a check written by a check writer. Generally, the check writer would provide a written check to be cashed to a teller or merchant whom would type in or swipe the check and the check writer's information, e.g., driver's license, through a machine. The check information and the check writer's information is transmitted to a host database computer to perform a risk analysis. Several parameters may be analyzed, including, for example, time of day, date, check number, amount to be cashed, credit rating of the check writer, etc. Based on a predetermined rating format, the check is either approved or denied.

However, this system only provides an approval or denial of the check and is not configured to provide more information to the check writer. The check writer is provided with no information to gauge how much, if any, a merchant would be willing to cash. Thus, in situations where the check writer has been denied to cash a check for a particular amount, in many cases the merchant would have approved the check had the particular amount been written for less than what was initially requested. Likewise, in situations where the check writer has been approved to cash a check for a particular amount, in many cases the merchant would have approved the check for an amount greater than what had been requested.

Because the check writer is unaware of how much, if any, a merchant would be willing to cash, time is unnecessarily consumed. In many situations, especially in entertainment atmospheres, such as casinos, a check writer may cash a check for an amount less than what he would liked to have had and less than what the merchant would have approved. As a result, the check writer frequents the cashiers desk more often than if he had initially cashed his check at a higher amount. Alternatively, the check writer would thereafter leave the casino to attempt to cash a check elsewhere, e.g., another casino, resulting in loss of entertainment business at the former casino.

Another current system being used generally includes an analysis which approves a requested amount by a check writer, approves the check writer for a lesser amount, or declines the transaction. Information is provided to a host database computer similar to the system described above. The parameters used in the system described above may also be the parameters used in this system. A risk analysis is then performed by the host database computer based on the parameters. In addition to simply approving or denying the check, the system provides the check writer with an amount that the merchant would be willing to approve for check cashing. Thus, in situations where the check writer is denied, the check writer would then know how much he could check-cash.

However, this system typically only provides a maximum to be immediately cashed and is not configured to provide a time period within which a check may be cashed for the amount. The check writer is kept unaware of any additional amount he could check-cash at a later time, e.g., the next day. In fact, the current system does not determine a time period within which the check writer may cash checks. Generally, the system performs a separate risk analysis for each check cashing incident. As a result, time is unnecessarily consumed, due to the cumulative amount of repeated risk analysis performed during a short time period. This is undesirable.

Additionally, both systems mentioned above allow the check writer to be denied in front of others while they wait, potentially resulting in an undesirable embarrassment. If a system is configured to provide the check writer with a check cashing limit over a period of time, in advance, such embarrassments could be avoided.

Thus, what is needed is an improvement in a system which provides check writers a check cashing limit over a time period.

What is also needed is an improvement in a system which saves time in the process of risk analysis of the check writer.

What is also needed is an improvement in a system which reduces check writer embarrassment and increases spending.

DISCLOSURE OF INVENTION

Accordingly, it is an object of the present invention to provide an improved system and method of approving a money limit of check cashing for a time period during which a check writer may cash checks up to the limit.

It is a further object of the present invention to provide an improved system and method of approving a money limit of check cashing in order to provide a check writer, in advance, with a check cashing limit over a time period during which the check writer may cash checks up to the limit.

It is a further object of the present invention to provide an improved system and method of approving a money limit of check cashing for a time period which saves time in the process of risk analysis and reduces embarrassment while increasing spending.

A more specific object of this invention is a method of approving a money limit of check cashing for a time period which saves time in the process of risk analysis and reduces embarrassment while increasing spending.

A more specific object of this invention is a method of approving a money limit of check cashing for a time period during which a check writer may cash checks up to the limit. The method involves storing historical check writing information for a plurality of check writers, receiving identification information to access respective check writing information of the check writer, processing the information to determine a score for the check writer presenting a check based on the information, classifying the check writer in a predetermined category based on the score, and determining the limit over the time period during which the check writer may cash checks up to the limit based on the category in which the check writer is classified. The method further includes declining the check writer to cash checks for the time period, if the check writer is classified in one category, and approving the check writer to cash checks for the limit over the time period if the check writer is classified in another category.

Another specific object of this invention is a money limit approving system for check cashing for a time period during which a check writer may cash checks up to the limit. The system includes a first mechanism for storing historical check writing information for a plurality of check writers, a second mechanism for receiving identification information to access respective check writing information of the check writer, for a third mechanism for processing the information to determine a score for the check writer presenting a check based on the information, a fourth mechanism for classifying the check writer in a predetermined category based on the score, and a fifth mechanism for determining the limit over the time period during which the check writer may cash checks up to the limit based on the category in which the check writer is classified. The system further includes a sixth mechanism for declining the check writer to cash checks for the time period, if the check writer is classified in one category, and for approving the check writer to cash checks up to the limit over the time period if the check writer is classified in another category.

BRIEF DESCRIPTION OF DRAWINGS

FIG. 2 is a flow chart illustrating one method of approving a money limit provided by the present invention in accordance with the system of FIG. 1a;

FIG. 3 is a table exemplifying ranges of risk scores within which the check writer may be classified.

BEST MODE FOR CARRYING OUT THE INVENTION

Figure 1A:
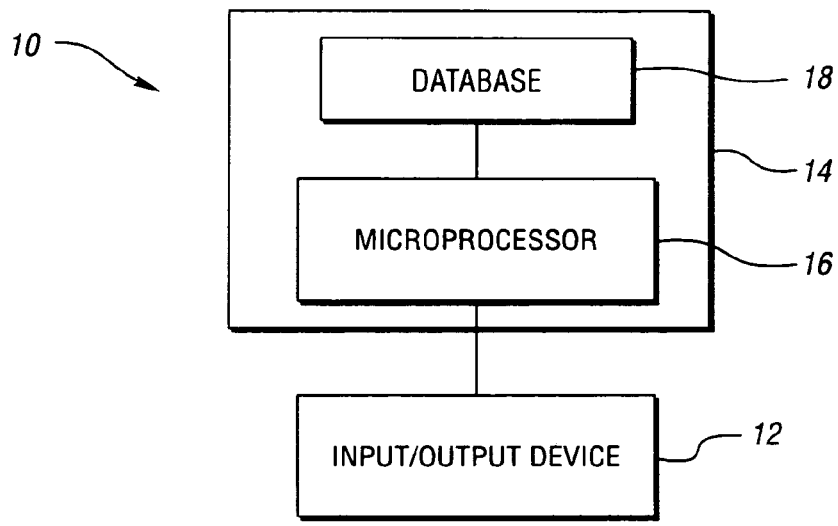
FIG. 1a is a schematic view of an overall system for approving a limit of check cashing in accordance with one embodiment of the present invention.

FIG. 1a schematically illustrates a system 10 of the present invention used for approving a money limit of check cashing for a time period during which a check writer may cash checks up to the limit. As shown in FIG. 1a, system 10 includes an input/output (I/O) device 12, a host computer 14 in communication with I/O device 12. Host computer 14 has microprocessor 16 and database 18 which is in communication with microprocessor 16.

I/O device 12 provides a mechanism through which identification information may be inputted into system 10. I/O device 12 may be any type of suitable device which is capable of sensing magnetic ink and magnetic stripes from items such as checks and cards. I/O device 12 may have a magnetic swipe slot to sense a magnetic portion of a check and a magnetic stripe of a card. Additionally, I/O device 12 may have a display screen, a keypad, and a slip printer. Moreover, device 12 includes a modem which transmits the information to host computer 14. Also, a plurality of I/O devices 12 may be used such that host computer 14 may be accessed from different locations. For example, I/O device 12 may be a product having the trade name ACCELERA™ manufactured by TeleCheck Services Inc. I/O device 12 may be disposed at any point of a transaction in which the check writer may cash or write a check, e.g., a casino, a hotel, etc.

As stated above, host computer 14 includes microprocessor 16 and database 18. Database 18 provides a mechanism for storing historical check writing information for a plurality of check writers such that check cashing information from device 12 may be categorized as described below. Database 18 may be any type of suitable medium in which the information may be stored. For example, database 18 may be a disk drive and a control or a plurality of disk drives and controls having the trade name STORAGEWORKS™ manufactured by Digital Equipment Corporation and having storage capacity of 9 gigabytes.

Microprocessor 16 provides a mechanism for receiving identification information to access the respective historical check writing information of the check writer, for processing the respective historical check writing information to determine a score for the check writer presenting a check based on the respective historical check writing information and for classifying the check writer in a predetermined category based on the score. Additionally, microprocessor 16 provides a mechanism for determining the limit over the time period during which the check writer may cash checks up to the limit based on the category in which the check writer is classified. Microprocessor 16 declines the check writer to cash checks for the time period, if the check writer is classified in one category, and approves the check writer to cash checks for the limit over the time period, if the check writer is classified in another category.

Microprocessor 16 may be any suitable processor which is capable of fulfilling the functions described below such as processing the information to determine the score, classifying the check writer in a predetermined category, determining the limit, and declining or approving the check writer based on the category in which the check writer is classified. Microprocessor 16 may execute computer programs to carry out various functions described. For example, microprocessor 16 may be a processor having the trade name AXP™ manufactured by Digital Equipment Corporation having 600-650 megahertz of speed and any suitable amount of memory. Moreover, a plurality of processors may be used. Microprocessor 16 and database 18 may be in communication by any suitable means, such as by hardwire.

The means through which device 12 and host computer 14 are in communication may be by telecommunication networks. As stated above, I/O device 12 has a modem which may be used to communicate with host computer 14. Likewise, host computer 14 may also have a modem to transmit and receive information.

Figure 1B:
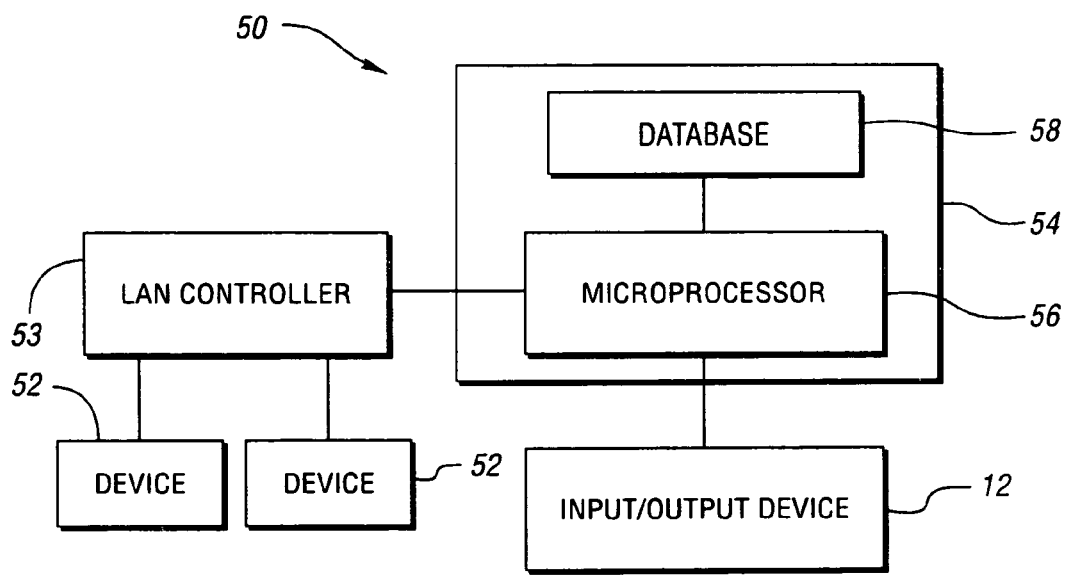
FIG. 1b is a schematic view of another overall system for approving a limit of check cashing in accordance with one embodiment of the present invention.

In another system 50, as shown in FIG. 1b, a plurality of device 52 may be used in communication with host computer through Local Access Network (LAN) computer 53. System 50 includes components similar to components of system 10 above. Particularly, host computer 54, microprocessor 56, and database 18 are respectively similar to host computer 14, microprocessor 16, and database 18 of the embodiment described above. The means through which devices 52 and host computer 54 are in communication may be by a dedicated line.

Figures 2, 3:
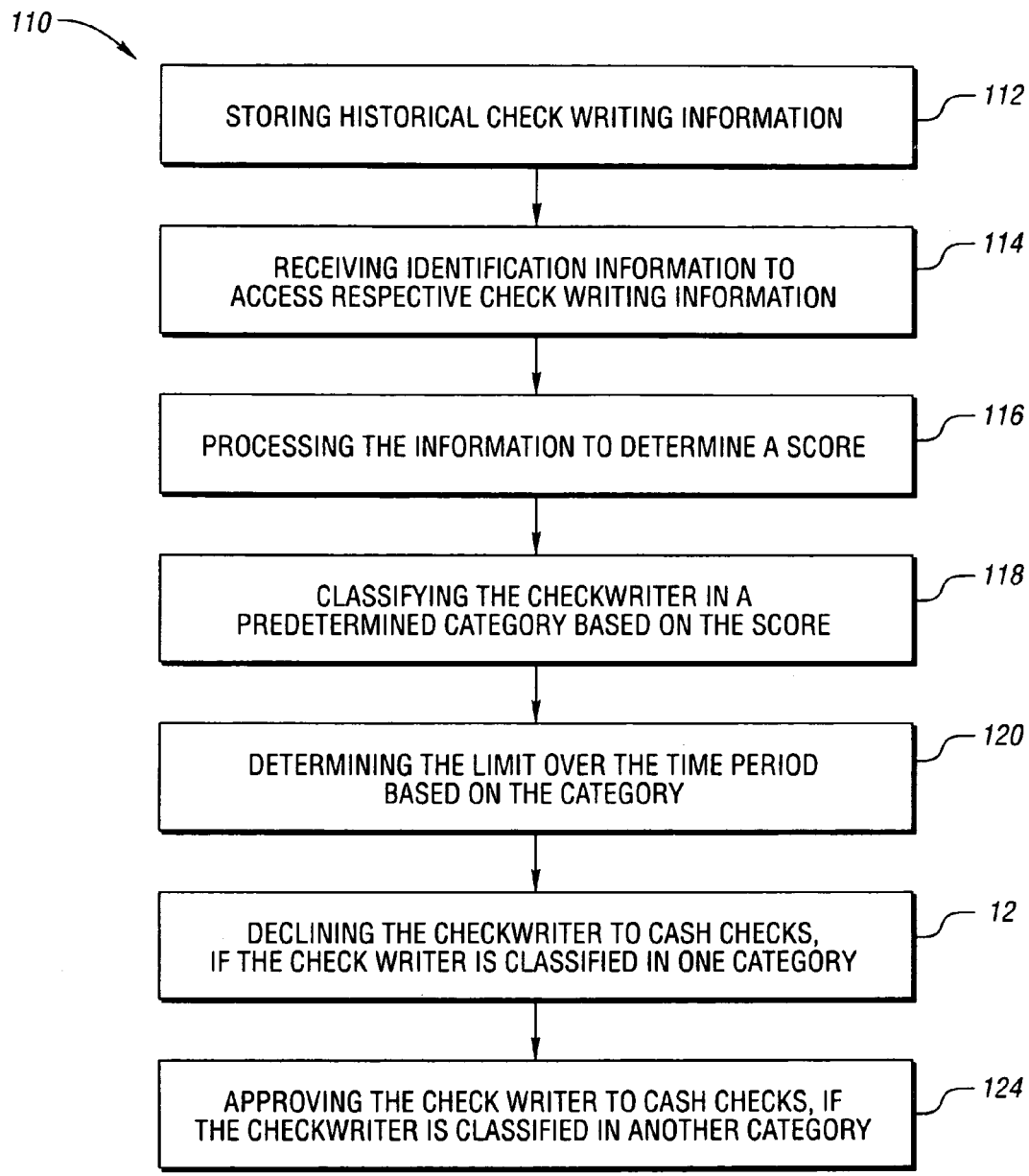

FIG. 2 illustrates an example of a method of the present invention in accordance with system 10 of FIG. 1a. In this embodiment, historical check writing information is prestored in database 18. The historical check writing information involves information for a plurality of check writers and includes information of the plurality of check writers indicative of their risk and/or collectability. For example, for each check writer, the check writing information may include number of checks written, number of checks returned for insufficient funds, credit rating, etc. Then, I/O device 12 receives identification information from a check and/or a card having a magnetic portion or stripe. Identification information involves information identifying the check writer, e.g., a bank account, drivers license, social security number, etc. At the point of transaction, device 12 transmits identification information to host computer 14 by way of, for example, telephone networks, dedicated line, etc. Device 12 may also transmit a transaction amount representing an amount the check writer desires to cash. Microprocessor 16 receives the identification information to access respective historical check writing information of the check writer and processes the respective historical check writing information to determine a risk score for the check writer who is presenting a check to be cashed.

More specifically, the score for the check writer is based on the respective historical check writing information of the check writer and is determined through a risk analysis program configured in microprocessor 16. For example, through the program, microprocessor 16 accesses the respective historical check writing information of the check writer from database 18. In this embodiment, the program may have a number of parameters, each of which represent historical information accessed from database 16. Each of the parameters may be a numeral. The parameters may be incorporated within calculations in order to determine a subscore for each parameter. In this embodiment, the subscores are then added to determine a risk score of the check writer. It is to be noted that other determinations of the risk score do not fall beyond the scope and spirit of the invention.

The subscores for the parameters may be determined using different calculations based on a predetermined importance of each parameter. For example, microprocessor 16 may be configured to weigh the number of checks written by the check writer with the most importance. In this situation, the importance placed on a parameter that is indicative of the number of checks written may be mathematically represented in the calculations, providing greater affect on the risk score than the other parameters. Depending on a point of reference, the analysis may be affected by having a higher or lower value.

Microprocessor 16 then classifies the check writer in a predetermined category based on the risk score and determines the limit over the time period during which the check writer may cash checks up to the limit. The limit is based on the category in which the check writer is classified.

As shown in FIG. 3, the category within which the check writer is classified may be a range within a table having a plurality of ranges of possible risk scores. In this embodiment, the range in which the risk score of the check writer falls determines the range within the table and, thus, the category within which the check writer is classified. For example, as shown in FIG. 3, a risk score of 250 falls in a range between "201-300" risk scores.

As shown in FIG. 3, at least one limit over a time period is provided during which the check writer may cash checks. In this embodiment, a higher risk score provides a higher limit. For example, a risk score of 250 classified in the range between "201-300" provides a $700 per day limit and a $3,000 six-day limit. On the contrary, a risk score of 70 provides a $0 per day limit and a $0 six-day limit, resulting in a decline of the check writer to cash a check. The limits in accordance with the ranges of risk scores may be determined by any suitable means.

Microprocessor 16 then either declines or approves the check writer based on the category in which the check writer is classified. If the check writer is classified in one category, then microprocessor 16 declines the check writer to cash checks for the time period. Microprocessor 16 approves the check writer to cash checks for the limit over the time period, if the check writer is classified in another category. Microprocessor 16 then may transmit the approval limits or denial to I/O device 12 to be displayed to a teller.

For example, as shown in FIG. 3, if the risk score falls within the range of "0-100," then the check writer is declined for one day from cashing a check. On the contrary, if the risk score falls within the range of "301-400," then the check writer is approved for check-cashing $1,000 per day and $5,000 within six days.

Figure 4:
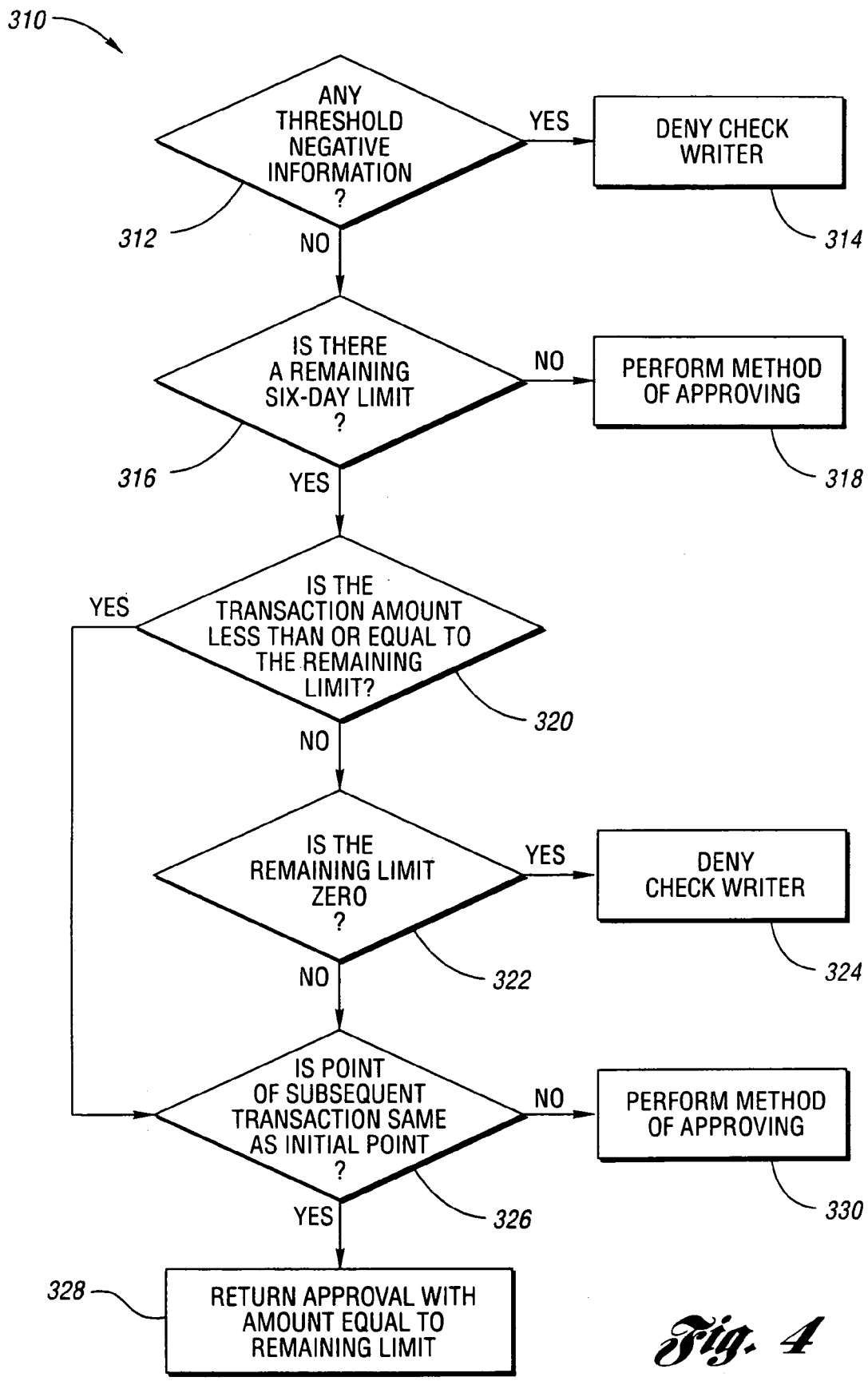
FIG. 4 is another flow chart illustrating a method of approving money limits in furtherance of the method of FIG. 2.

Microprocessor 16 may also be configured to retain within its memory a record for each calculated risk score for the time period within which a limit was determined, e.g., six days. As shown in 310 of FIG. 4, for subsequent transactions by the check writer within the time period, microprocessor 16 may simply access the calculated risk score and the remaining amount of the limit available to the check writer for check-cashing. Thus, an approval with a revised limit or denial may be made, in advance, to the check writer before writing a check and without performing the risk analysis program.

In this embodiment, after receiving the identification information of the check writer from I/O device 12, microprocessor 16 accesses information from database 18 to determine whether there are any threshold negative information of the check writer in 312, such as whether the check writer has any outstanding returned checks for insufficient funds. If threshold negative information exists, then microprocessor 16 sends a signal to device 12 denying the check writer in 314. If not, then microprocessor 16 determines whether there is a remaining six-day limit of the check writer from a previous risk analysis in 316. If not, microprocessor 16 continues with a method of approving a money limit as exemplified in FIG. 2 in 318. If there is a remaining limit, then microprocessor 16 determines whether the transaction amount is less than or equal to the remaining limit in 320. The remaining limit may be equal to the six-day limit minus the amount of checks cashed by the check writer during the six-day time period.

If the transaction amount is not less than or equal to the remaining limit, the microprocessor 16 determines whether the remaining limit is zero in 322. If the remaining limit is zero, then microprocessor 16 transmits a signal to device 12 to deny the check writer for the transaction amount in 324. If the remaining limit is not zero, then microprocessor 16 determines whether the point of the subsequent transaction is the same as the initial point of transaction in 326. The point of transaction, location of which may be recorded by microprocessor 16, may vary in situations where a different merchant is involved. For example, points of transactions may differ between different casinos or hotels, having different standards of approving checks.

If the point of the subsequent transaction is the same, then microprocessor 16 transmits a signal to device 12 approving the check writer for an amount equal to the remaining limit in 328. If not, the microprocessor 16 continues with a method of approving a money limit as exemplified in FIG. 2, incorporating recent transactions of the check writer in 330.

If the transaction amount is less than or equal to the remaining limit, the microprocessor 16 skips determining whether the remaining limit is zero and determines whether the point of the subsequent transaction is the same as the initial point of transaction in 326, as described above.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of approving a money limit of check cashing for a time period during which a check writer may cash checks up to the limit for a plurality of different purchase transactions, the check writer one of a plurality of check writers, the method comprising executing computer program instructions by one or more processors for:
    storing, by at least one processor, historical check writing information for the plurality of check writers;
    receiving, by at least one processor, identification information to access respective check writing information of the check writer;
    processing, by at least one processor, the respective check writing information to determine a score for the check writer presenting a check based on the respective check writing information;
    classifying, by at least one processor, the check writer in a pre-determined category based on the score; and
    determining, by at least one processor, the money limit over the time period during which the check writer cashes a plurality of checks in respective check writing transactions for a respective plurality of different purchase transactions up to the money limit based on the category in which the check writer is classified.

2. The method of claim 1 further comprising:
    declining approval of the check writer to cash checks for the time period if the check writer is classified in one category; and
    approving the check writer to cash checks for the limit over the time period if the check writer is classified in another category.

3. The method of claim 1 wherein processing comprises:
    representing the respective check writing information within a plurality of numeric parameters;
    incorporating each of the parameters within at least one calculation to determine a subscore for each of the parameters, the subscore being indicative of collectibility of the check writer; and
    adding the subscores to determine the score.

4. The method of claim 1 wherein the category in which the check writer is classified is a range within a plurality of set ranges of scores.

5. The method of claim 1 further comprising:
    storing the determined money limit and a remaining limit for the time period, the remaining limit being equal to the determined money limit minus the amount of cashed checks by the check writer during the time period;
    determining whether the check writer has any outstanding returned checks; and
    declining the check writer if the check writer has any outstanding returned checks.

6. The method of claim 5 further comprising:
    receiving a transaction amount if the received identification information is within a predetermined time, the transaction amount being an amount for check cashing;
    comparing the transaction amount with the remaining limit;
    determining whether the remaining limit is zero, if the transaction amount is greater than the remaining limit;
    declining the check writer, if the remaining limit is zero; and
    approving the check writer with the remaining limit, if the remaining limit is not zero or if the transaction amount is less than or equal to the remaining limit.

\* \* \* \* \*